United States Patent [19]
Crook et al.

[11] Patent Number: 6,119,882
[45] Date of Patent: Sep. 19, 2000

[54] SELF-PROPELLED BOOM WITH EXTENDIBLE AXLES

[75] Inventors: Gary Crook, Reedley; Lawrence E. Paquette, Fresno, both of Calif.

[73] Assignee: UpRight, Inc., Selma, Calif.

[21] Appl. No.: 09/206,035

[22] Filed: Dec. 4, 1998

[51] Int. Cl.$^7$ .................................................. B60B 35/10
[52] U.S. Cl. .......................... 212/301; 180/433; 180/906
[58] Field of Search ............................ 212/301; 180/906, 180/433; 91/464; 280/638

[56] References Cited

U.S. PATENT DOCUMENTS

| | | | |
|---|---|---|---|
| 2,111,668 | 3/1938 | Latzen | 180/433 |
| 2,557,936 | 6/1951 | Brown | 180/433 |
| 3,092,083 | 6/1963 | Sheppard | 91/378 |
| 3,240,285 | 3/1966 | Williamson | 180/433 |
| 3,822,759 | 7/1974 | Sheppard | 180/433 |
| 4,039,094 | 8/1977 | Grove | 180/906 |
| 4,449,600 | 5/1984 | Telfer | 180/906 |
| 5,454,583 | 10/1995 | Torborg | 180/906 |
| 5,489,113 | 2/1996 | Torborg | 180/906 |

*Primary Examiner*—Thomas J. Brahan
*Attorney, Agent, or Firm*—Bruce H. Johnsonbaugh

[57] ABSTRACT

A self-propelled boom vehicle has an extendible axle and an extendible steering mechanism which has an automatic steering synchronization system. The extendible axle has a hollow central support sleeve and telescopic arm sections. A single hydraulic extension axle is positioned inside the hollow central support sleeve and connects to and drives the telescopic arm sections between their retracted and extended positions. The steering synchronization system includes a pair of steering cylinders in a closed hydraulic circuit working in a master-slave arrangement and which operate inversely with respect to each other. A mechanical check valve is carried by each piston which allows excess hydraulic fluid to flow through the check valve to allow the piston to travel to the end of its stroke to resynchronize the steering.

7 Claims, 11 Drawing Sheets

SELF-PROPELLED BOOM WITH EXTENDIBLE AXLES

BACKGROUND AND BRIEF SUMMARY OF THE INVENTION

The present invention relates generally to self-propelled booms which carry at the tip end of the boom either a work platform or a work attachment. More particularly, the present invention relates to a self-propelled boom vehicle with extendible axles and with associated extendible steering linkage.

It is known in the prior art to provide a self-propelled boom vehicle with extendible axles. The purpose of extendible axles is to widen the stance of the vehicle to increase its resistance to overturn and to increase its working load characteristics.

One prior art technique for extending the axles for a self-propelled boom is to use the main boom to react against the ground, thus lifting one end of the chassis. With that end of the chassis elevated above the ground, that axle is extended. The boom is then used to lower the chassis and then the boom is swung 180° before repeating the process at the opposite end of the chassis. Disadvantages of this technique include excessive wear of the boom slide pads and the need for a large clear area to swing the boom from one end to the other. That technique also has the potential for extensive damage from operators using the same process to extend the axles to attempt to push the machine out from a position in which it is stuck. The additional disadvantage is the time that the process requires to complete extension of the axles.

It is also known in the prior art to provide relatively large and heavy chassis mounted hydraulic jacks for self-propelled booms to lift sequentially each end of the chassis, extend the axle, then lower that end of the chassis before repeating the process for the opposite end. Disadvantages of this technique include the cost of the two large jacks and the requirement in soft ground conditions to provide the necessary shoring underneath the jack feet. This technique also requires considerable time to accomplish the extension of both axles. In each of these prior art techniques, the operator is required to exit the platform and to leave the controls of the vehicle to perform certain functions from the ground in order to extend the axles. This inherently involves further waste of time in extending the axles.

In contrast to these two described techniques for extending self-propelled boom axles, the present invention quickly and efficiently extends the axles while the axles are supporting the full weight of the vehicle. Furthermore, the present invention does not require the operator to either leave the controls of the vehicle or, if the vehicle contains a work platform, the operator need not exit the work platform in order to extend the axles. The present invention also includes the inherent advantage in requiring no independent action from the operator which must be conducted from the ground. Those operations, such as the insertion or removal of pins, may cause injury or damage to the vehicle or property if the operator neglects to perform the required functions.

The prior art also includes agricultural spraying equipment with extendible axles. The Balmer U.S. Pat. No. 5,039,129 dated Aug. 13, 1991 teaches a field sprayer having two forward and two rear extendible axles. The axles are extendible horizontally on the go. However, the design of that prior art patent requires a two part chassis wherein the forward, steerable section of the chassis must be pivotally connected to the remainder of the chassis. The steering mechanism of that patent is accomplished by the use of a diagonally mounted steering cylinder which causes the two pivotally connected chassis sections to articulate relative to each other. That steering mechanism would be woe-fully inadequate for a self-propelled boom. Firstly, the use of two pivoting chassis sections would reduce the vehicle's resistance to overturn. Secondly, the articulating chassis would be prohibitively expensive for the relatively large vehicle weights and working loads achieved by the present invention. Thirdly, a steering mechanism requiring the rotation of the entire forward axle around a vertical axis would inherently cause unexpected lateral motion of an extended boom simply by turning the steering control to the left or right. Such a steering mechanism is simply unworkable for a self-propelled boom vehicle.

Another prior art row crop applicator is shown in the Torborg U.S. Pat. No. 5,489,113. That patent teaches an extendible axle but the mechanism requires the use of two separate cylinders for each axle, both of which are mounted on the exterior surface of the central, fixed axle section. The outer end of the cylinders connects through a linkage mechanism to the movable, extendible axle members. The use of exterior mounted cylinders is definitely a disadvantage in self-propelled booms such as in the present invention. Exterior mounted cylinders would be exposed to damage, and to the natural elements as well as to dust and debris commonly experienced at construction work sites. The Torborg linkage connection between the cylinder and the movable axle section is relatively cumbersome. The present invention provides a single interior mounted cylinder, both ends of which are attached to movable axle sections and the cylinder acts directly on both movable axle sections without any intervening linkage. The system of the present invention protects the hydraulic cylinder from the elements as well as from job site dust and debris. By using only one cylinder, the present invention minimizes the working components, resulting in a much more dependable extension mechanism. Furthermore, the present invention avoids bending loads being applied to the cylinder. Since the extendible axle arms of the present invention are exposed to large bending loads and deflection, it is important to position the cylinder to avoid those bending loads. The present invention in effect provides a "floating" cylinder mount by connecting both cylinder ends directly to the extendible axle arms. This direct and floating mounting of the cylinder also allows the axle arms to extend sequentially, i.e., the axle will extend in the direction of least resistance. The sequential extension allows all of the cylinder's power to be utilized to extend the second axle arm after the first arm is fully extended.

The Torborg '113 patent also teaches a hydraulically adjustable tie rod which modifies the steering linkage as the axle is extended. However, the Torborg mechanism requires that the operator leave the controls of the vehicle to fine tune the steering toe-in by manually rotating hex nuts 36. The present invention provides an adjustable steering linkage in the form of a master and slave cylinder arrangement and wherein an automatic resynchronizing system is included to automatically resynchronize the steering.

The Torborg U.S. Pat. No. 5,454,583 teaches an agricultural vehicle wherein the axles are adjustable and wherein an autotracking system is provided which automatically insures that the rear axle is set to the same width as the forward axle.

A primary object of the present invention is to provide a self-propelled boom with extendible axles wherein the axles are extendible while simultaneously carrying the weight of the vehicle and without requiring the operator to exit the work platform or to leave the controls of the vehicle in order to extend the axles.

Another object of the invention is to provide a self-propelled boom with extendible axles wherein the extension mechanism for each axle includes a single hydraulic cylinder which is carried internally of the axle and which is mounted at both of its ends to the outwardly extendible arm sections.

Another object of the invention is to provide a self-propelled boom with extendible axles and with an automatically self-adjusting steering control mechanism.

A still further object of the invention is to provide a self-propelled boom with extendible axles and self-adjusting steering wherein the steering automatically resynchronizes itself as the steering is moved to either left or right lock position.

Other objects and advantages of the invention will become apparent from the following description and drawings wherein:

DETAILED DESCRIPTION OF THE DRAWINGS

Figure 1:
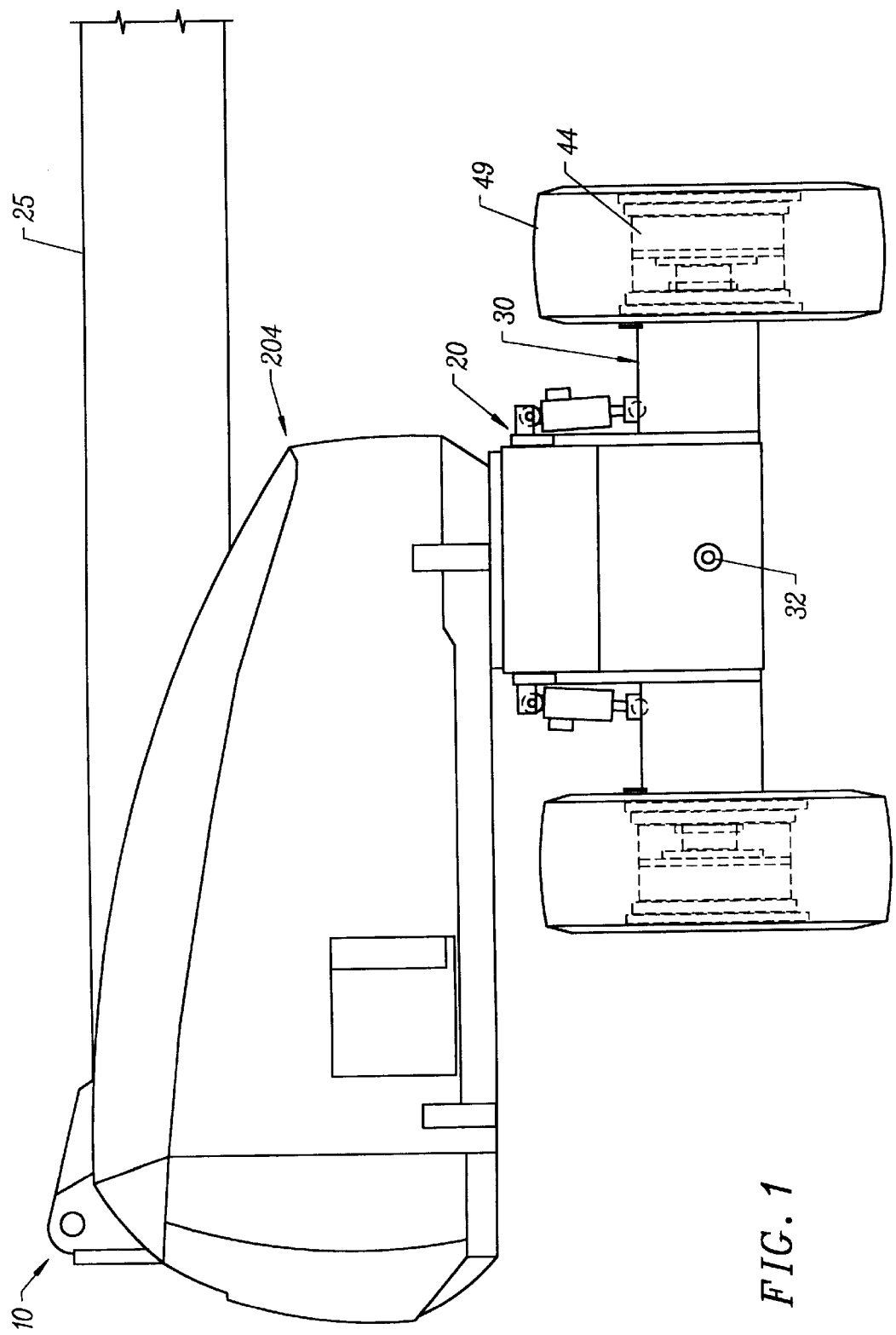
FIG. 1 is a front elevational view of a self-propelled boom vehicle according to the present invention showing the axle in its retracted position.
Figure 2:
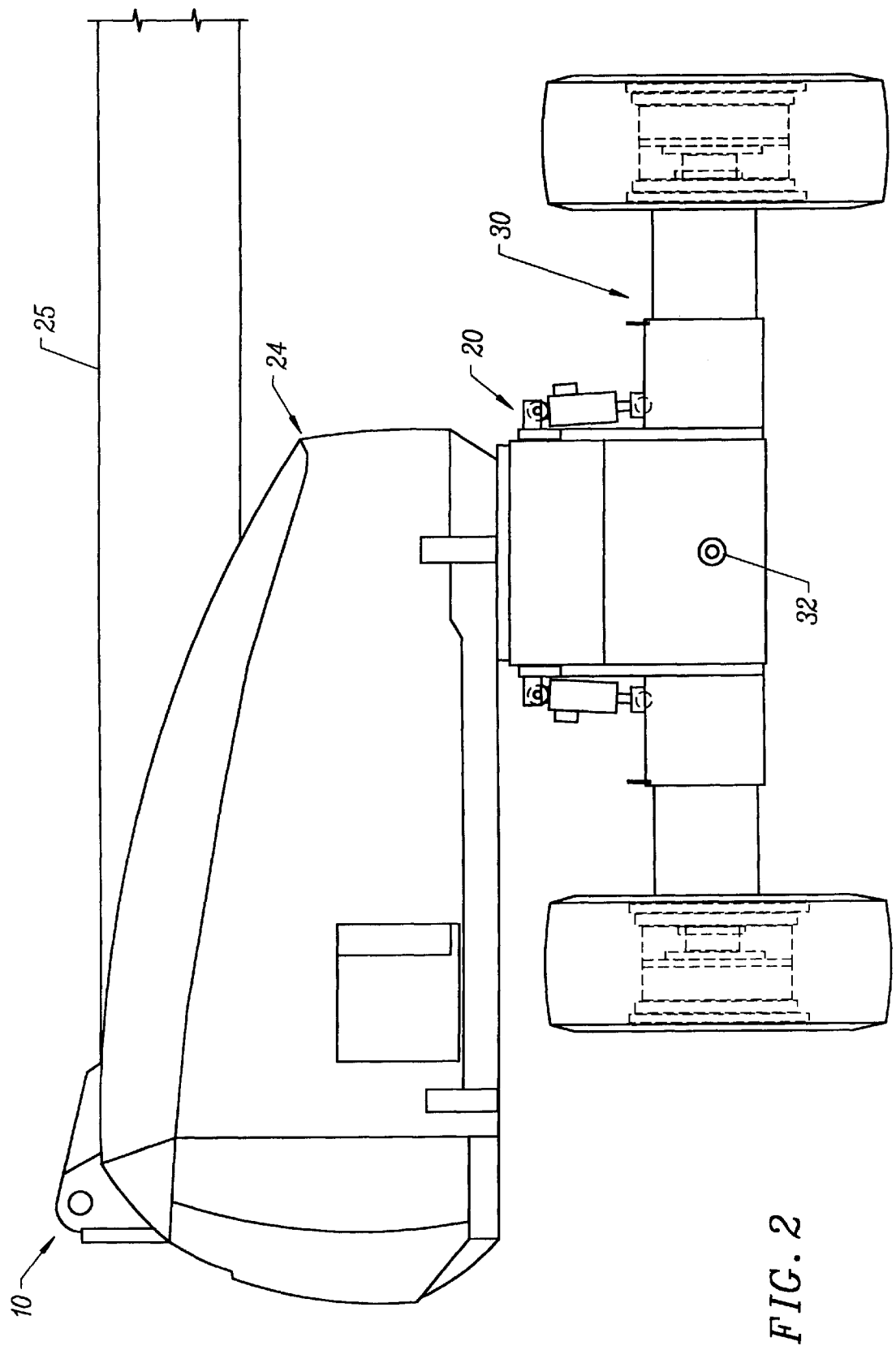
FIG. 2 is a front elevational view of the self-propelled boom vehicle shown in FIG. 1 according to the present invention wherein the axles are shown in their extended position.
Figure 9:
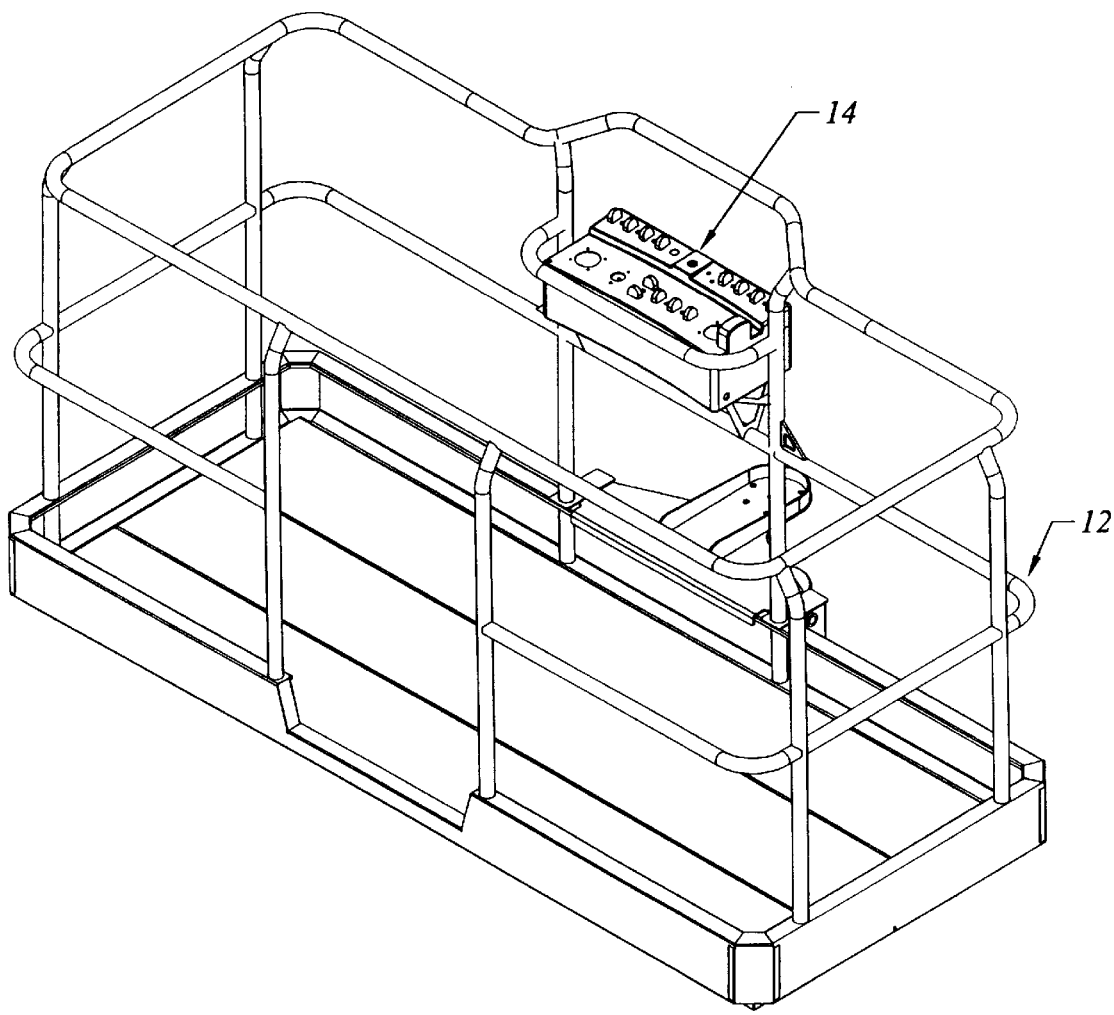
FIG. 9 is a perspective view of a work platform which may be used with the invention.

FIGS. 1 and 2 show a self-propelled vehicle 10 having a chassis 20, a boom 25 carried by chassis 20 and a turret 24 pivotally mounted on chassis 20 for supporting boom 25. The boom 25 is preferably a multi-sectional extendible boom and may carry at its tip end either a work platform 12 (FIG. 9) or a work attachment (not shown) as are known in the art. In the preferred form of the present invention, boom 25 has a total extended reach of 80 feet and wherein the operator controls the vehicle 10 from a work platform 12 having suitable controls 14 for the boom and chassis.

According to the present invention, the operator may remain in the work platform 12 while extending the axles of the vehicle.

The extendible axle of the present invention is shown generally as 30 in its retracted position in FIG. 1 and in its extended position in FIG. 2. The overall width of the vehicle 10 with the axles retracted as shown in FIG. 1 is 96 inches and the overall width (measured from the exterior surface of tire to tire) shown in FIG. 2 in its extended position is 126 inches.

Figure 3:
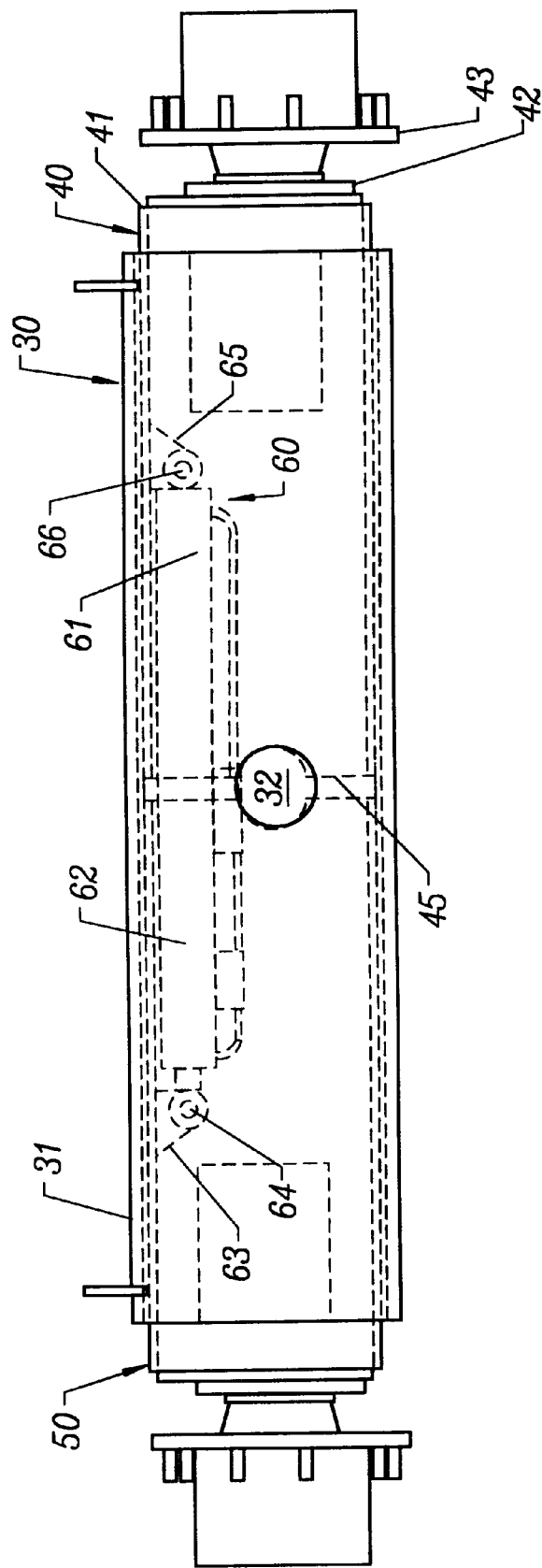
FIG. 3 is an elevational view showing an extendible axle according to the present invention.
Figure 4:
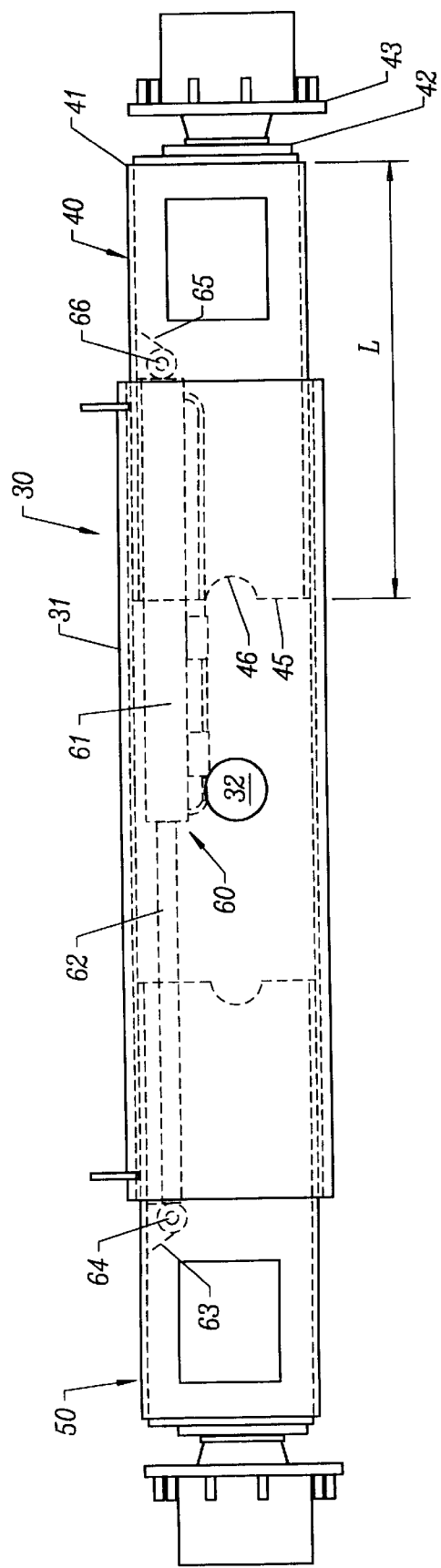
FIG. 4 is an elevational view of the extendible axle shown in FIG. 3 wherein the axle is shown in its fully extended position.
Figure 5:
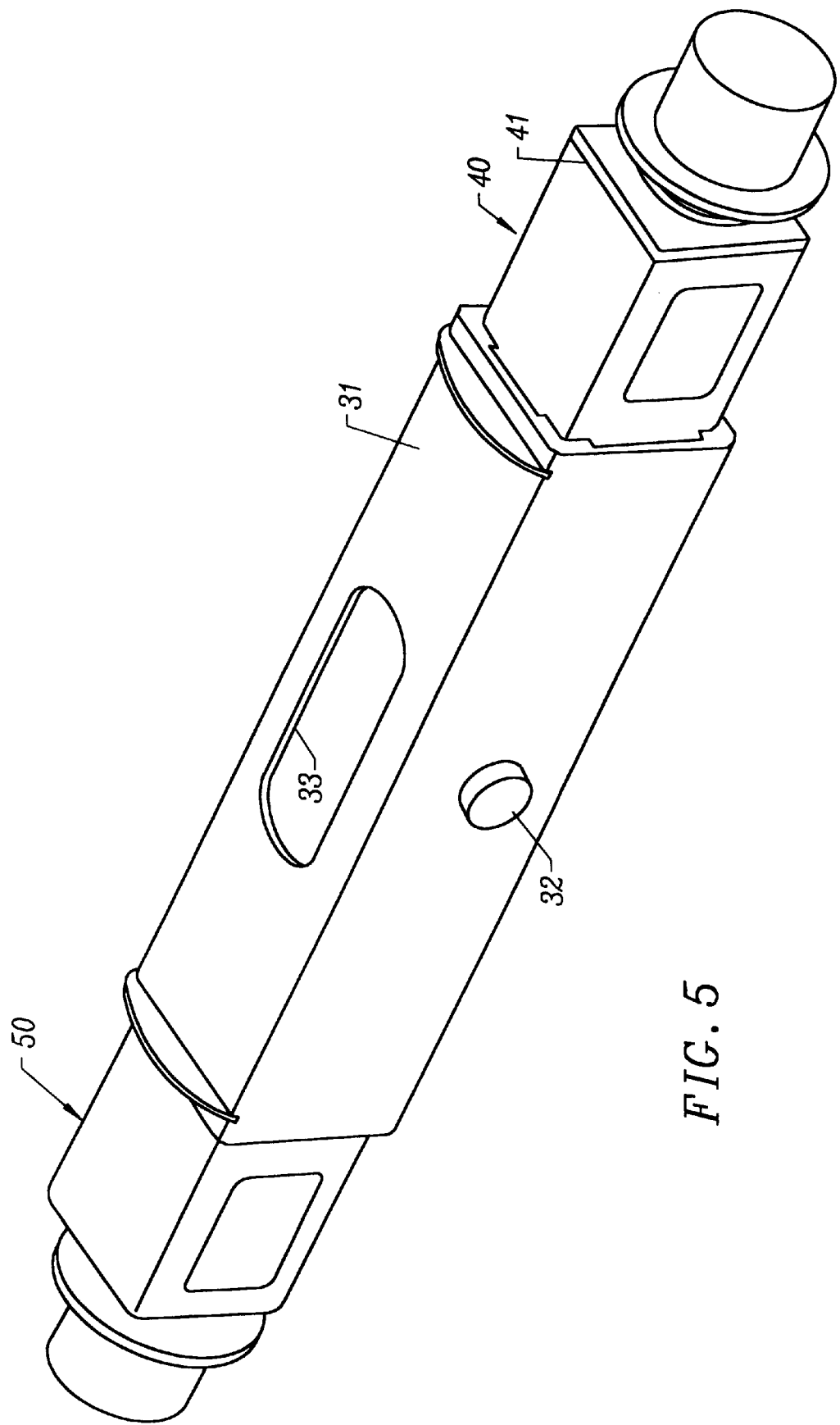
FIG. 5 is a perspective view showing in schematic form the extendible axle in its extended position.

FIGS. 3 and 4 show the extendible axle 30 apart from the vehicle 10. A hollow central support sleeve 31 is provided having a generally square cross section shown best in FIG. 5. A cylindrical pin 32 is carried by sleeve 31 and supports the chassis, turret and boom on axle 30. An elongated recess 33 is formed in the top surface of sleeve 31 and allows access to the hydraulic cylinder described below.

First and second telescopic arm sections 40 and 50 are provided which are hollow and which have generally square cross sections so that the arm sections 40 and 50 slidably engage the hollow central support sleeve 31. Telescopic arm sections 40 and 50 have a first retracted position shown in FIG. 3 and an extended position shown in FIGS. 4 and 5. Each of the telescopic arm sections 40 and 50 is identical in design and only the first arm section 40 will be described in greater detail. Telescopic arm section 40 has an outer end 41 that carries a suitable flange and bearing adaptor 42 which carries the rotating outer hub 43 which in turn supports the rim 44 and tire 49 (see FIG. 1). The inner end 45 of telescopic arm section 40 extends preferably to the center of hollow support sleeve 30 in its retracted position. The inner end 45 includes a semi-circular recess 46 slightly larger than passageway 32 in sleeve 31. When telescopic arm section 40 is extended as shown in FIG. 4, it has slightly less than one-half of its overall length "L" carried within central support sleeve 31. Extreme bending loads are applied to both telescopic arm sections 40 and 50 as well as to central support sleeve 31, particularly with the axle extended and when the boom is extended outwardly over the axle and is loaded. It is important under those conditions of extreme bending loads that the mechanism for extending the axle be isolated to the greatest extent possible from those bending loads.

Accordingly, a hydraulic axle extension means 60 is provided which includes a single hydraulic cylinder 61 positioned inside the central hollow support sleeve 31. Hydraulic cylinder 61 carries piston rod 62 which in turn is attached to second telescopic arm section 50 by a support tab 63 and pin 64. The cylinder 61, itself, extends slightly into the hollow interior of first telescopic arm section 40 and is connected to telescopic arm section 40 by mounting tab 65 and pin 66. It is significant to note that cylinder 61 is carried internally of the central support sleeve 31, internally of telescopic arm sections 40 and 50 and that the mounting tabs for the cylinder are connected directly to the telescopic arms 40 and 50. In this fashion, the hydraulic axle extension means 60 is effectively isolated from the bending loads that are applied between support sleeve 31 and arm sections 40 and 50 and the entire hydraulic axle extension means 60 is carried internally and, therefore, protected from damage as well as jobsite dust and debris. Another distinct advantage of having a single cylinder extending through the central support sleeve 31 and connected at each end to the telescopic arm sections 40 and 50 is that the telescopic arm sections are free to extend independently of each other. In practice, the operator remains in the work platform at the tip end of the boom and energizes the hydraulic cylinder 61 while slowly moving the vehicle forwardly and rearwardly. Hydraulic pressure is exerted simultaneously on both arm sections 40 and 50 and whichever arm section encounters the least resistance will extend to its full length. At that point in time, all of the power of hydraulic cylinder 61 is available to be exerted against the arm section encountering the greater resistance. The independent freedom of each arm section to extend simplifies the process of extending the axle with minimum tire scrubbing and minimum elapsed time.

Figure 6:
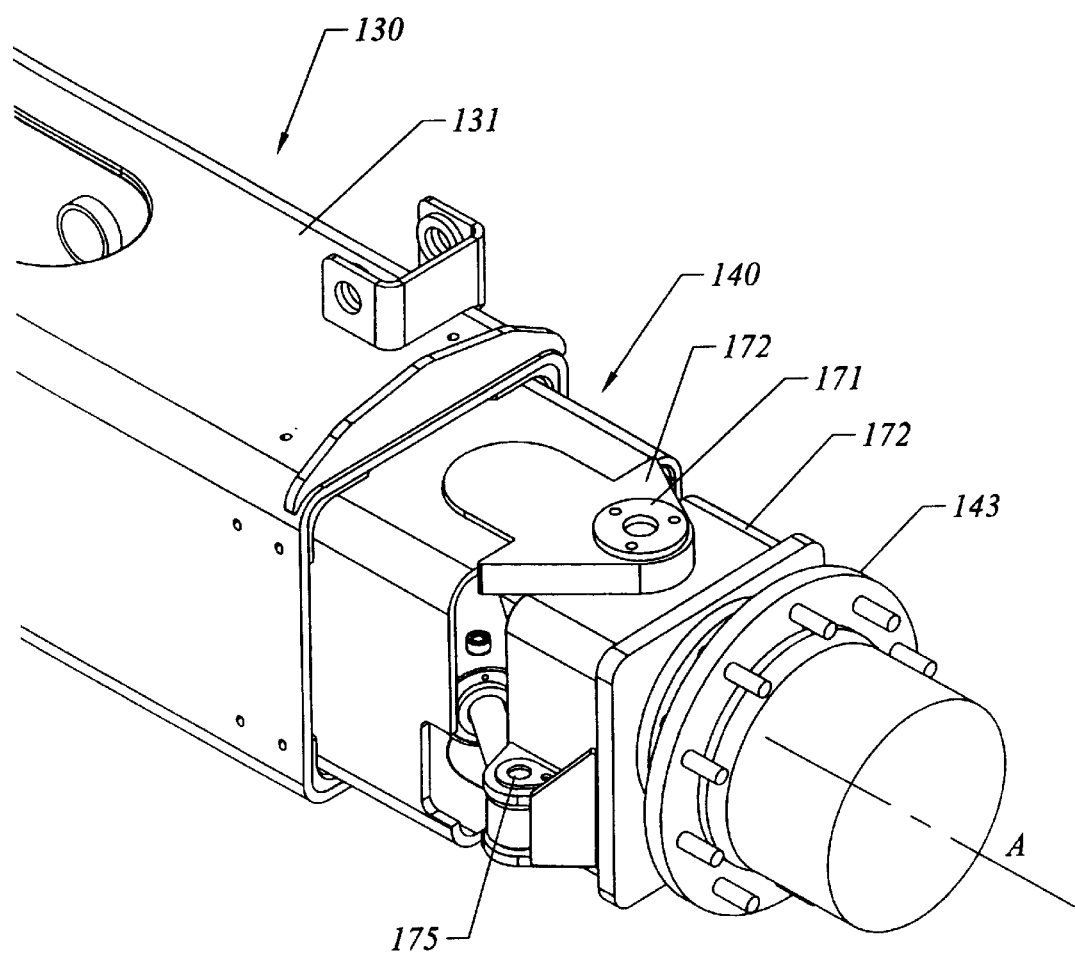
FIG. 6 is a perspective view showing a portion of the extendible axle of the present invention as utilized on a steering axle.
Figure 11:
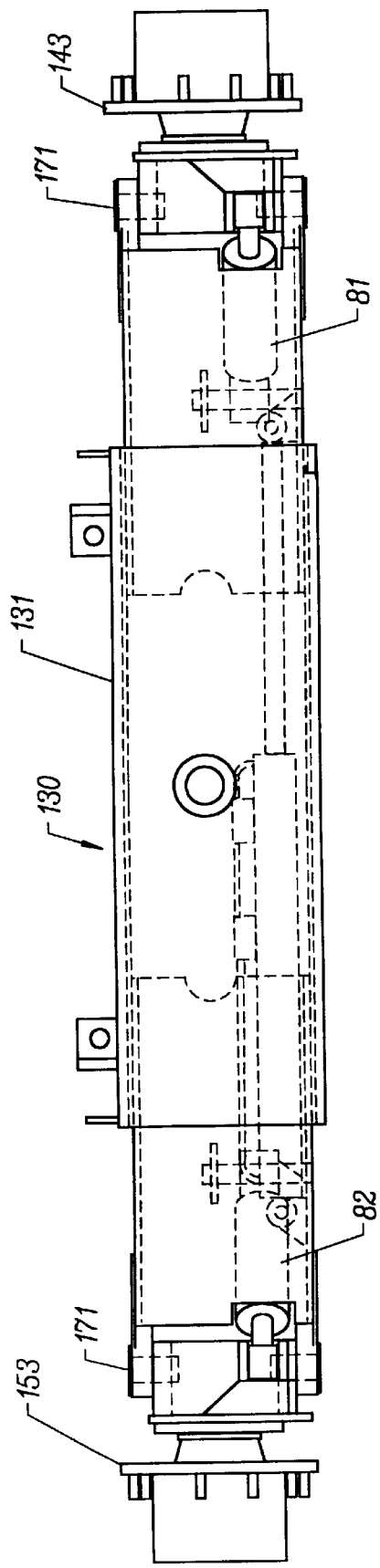
FIG. 11 is an elevational view showing an extendible steering axle according to the present invention.

FIGS. 6 and 11 show an extendible steering axle 130 essentially the same as the non-steering extendible axle 30 described above, but having steerable hubs 143 and 153. Arm section 140 slidably engages central sleeve 131. A kingpin 171 is mounted in a support member 172 carried by arm section 140. Hub 143 is carried by a rim and wheel, not shown for clarity. Hub 143 is connected to kingpin 171 by bearing housing 172 which allows hub 143 to rotate about axis A while pivoting about kingpin 171. Steering arm 175 (FIG. 6) is connected to cylinder rod 85c, described below.

Figure 7:
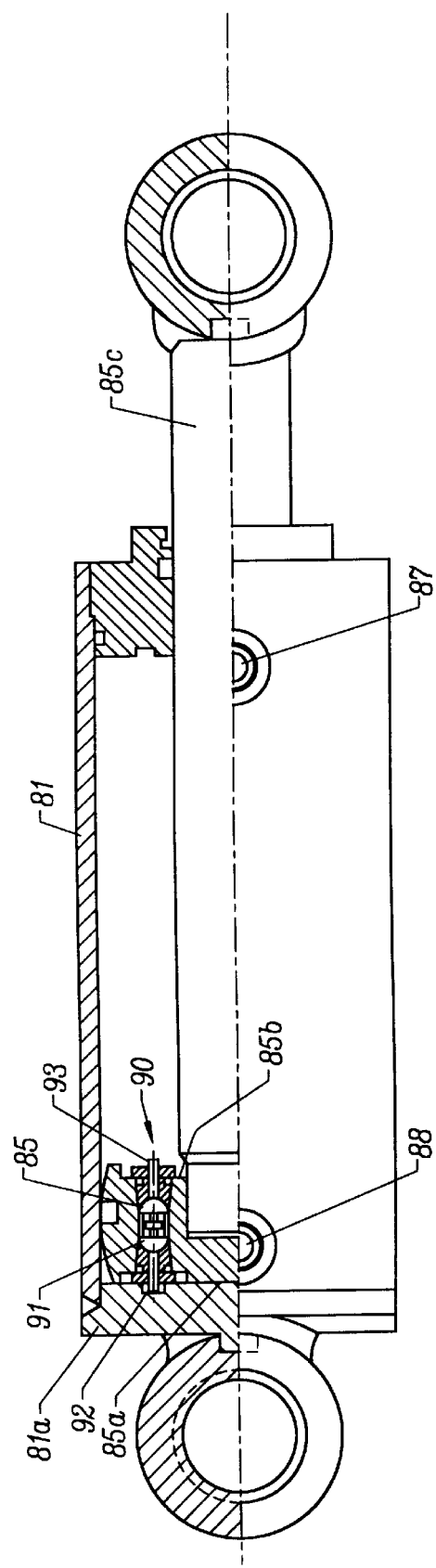
FIG. 7 is a partial sectional view of one of the two steering cylinders used in the present invention and showing the piston mounted check valve which resynchronizes the steering.
Figure 8:
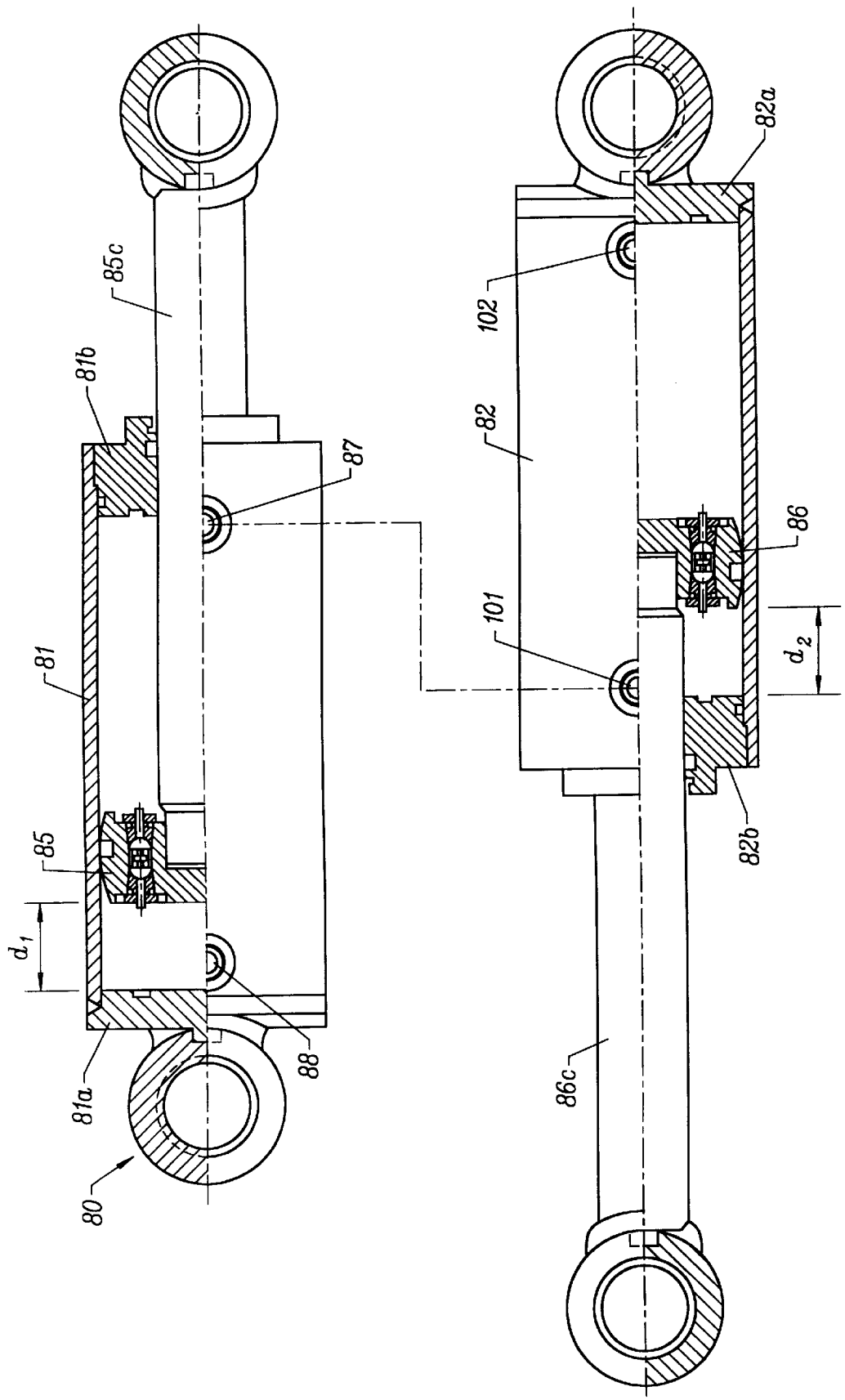
FIG. 8 is a schematic representation of the steering hydraulic system showing the master and slave cylinder arrangement used in the present invention.

FIGS. 7 and 8 show the adjustable hydraulic steering linkage means 80 for the vehicle 10. The extendible steering link means 80 includes a pair of steering cylinders 81 and 82 in a closed hydraulic circuit working in a master-slave arrangement. Cylinders 81 and 82 operate inversely with respect to each other so, as one steering cylinder moves in one direction, the other cylinder moves oppositely. The purpose of the extendible steering link means 80 is to automatically adjust the steering linkage as the steering axle of the vehicle is extended or retracted. FIG. 7 shows the righthand hydraulic cylinder 81 with piston 85, and a cylinder retract port 87 and a cylinder extend port 88. Cylinder port 87 of cylinder 81 is connected to the cylinder retract port 101 of lefthand cylinder 82 (FIG. 8), creating a closed hydraulic master-slave relation between cylinders 81 and 82. Cylinder extend ports 88 and 102 are connected to a hydraulic directional valve (not shown), supplying pressure for righthand and lefthand turn directions, respectively. The cylinders 81 and 82 operate inversely so that, if fluid is pumped into port 88 extending cylinder 81, the fluid exhausting from port 87 is forced into port 101, retracting cylinder 82. Hence, exact in distance but opposite in direction movement occurs between cylinders 81 and 82. Having hydraulic oil as the medium between each cylinder, they may travel with each telescoping axle while retaining the desired steering geometry.

The hydraulic steering system also includes a steering resynchronizing means 90 (FIG. 7) which allows the user to periodically resynchronize the steering by simply moving the steering to its full locked position in either direction. The manner in which this is accomplished is by the use of mechanical check valve 91 carried by each piston 85 and 86 of steering cylinders 81 and 82. Check valve 91 extends through piston 85 and includes pins 92 and 93 extending past the left surfaces 85a and 85b of piston 85. As piston 85 bottoms out as shown in FIG. 7, pin 92 contacts the end cap 81a of cylinder 81 and allows fluid entering port 87 to transfer through piston 85 and exhaust through port 88. FIG. 8 shows cylinders 81 and 82 and pistons 85, 86 in synchronized positions, wherein the distance $d_1$ between piston 85 and end cap 81a equals the distance $d_2$ between piston 86 and end cap 82b. The distances between pistons 85, 86 and end caps 81b and 82a are also equal.

Figure 10:
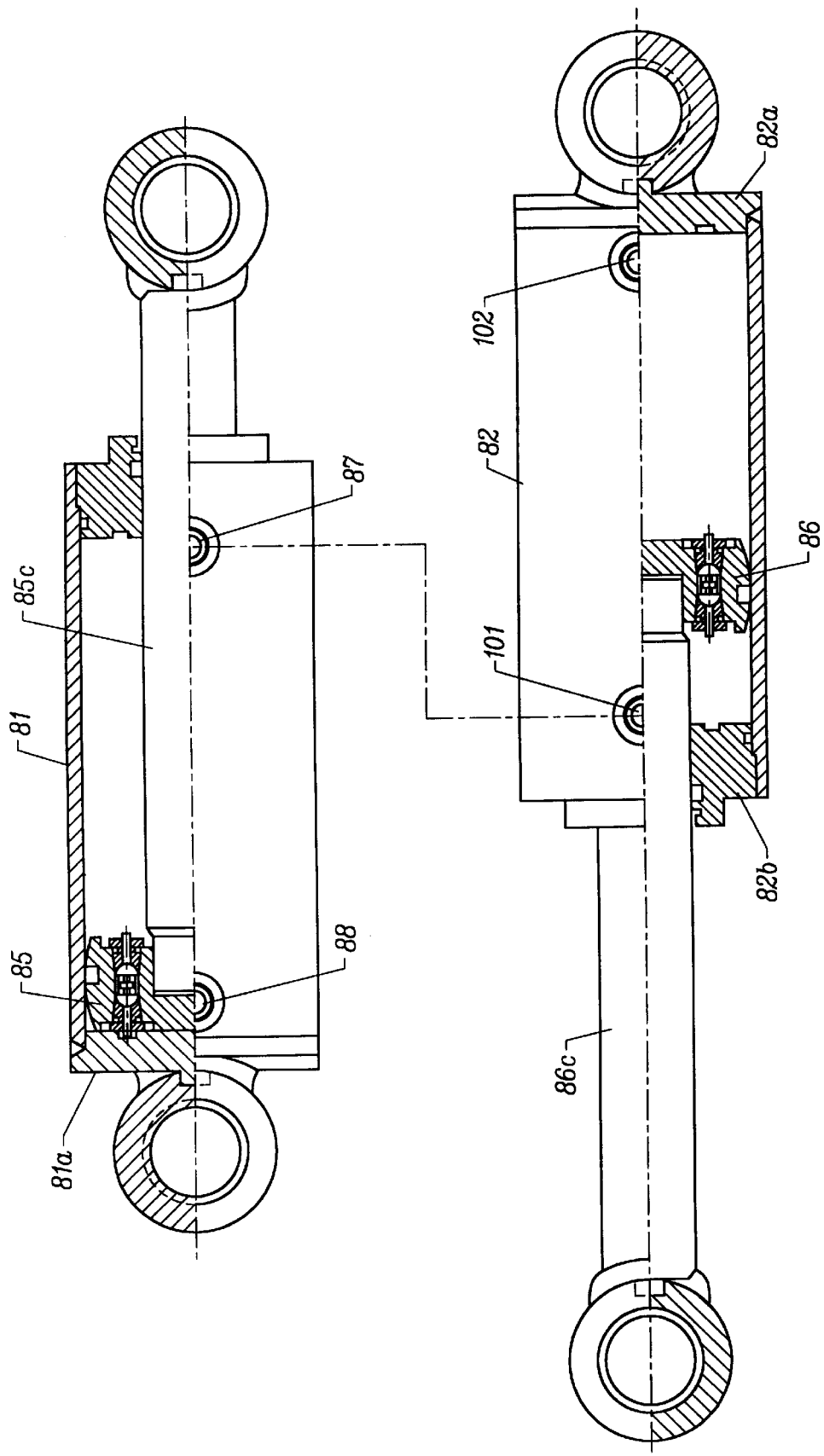
FIG. 10 is a schematic representation showing the steering cylinders and pistons in an unsynchronized position.

FIG. 10 shows the steering cylinders 81 and 82 and pistons 85 and 86 in unsynchronized positions. Cylinder 81 is retracted fully and cylinder rod 85c is retracted fully. However, piston 86 is not fully seated against the cap end 82b of cylinder 82. The operator actuates the steering to full lock position, pressurizing port 102, transferring the displaced fluid out of 101 and via the hydraulic link into 87, thus driving piston 85 and pin 92 into the base end 81a of cylinder 81. With pin 92 depressed, fluid is free to pass through piston 85 and hence piston 86 is brought into contact with cylinder end cap 82b and the steering is automatically resynchronized.

FIG. 11 shows the positioning of righthand steering cylinder 81 and lefthand steering cylinder 82 on extendible steering axle 130. Steering axle 130 has central hollow support sleeve 131, kingpins 171 and steerable hubs 143 and 153. Cylinders 81 and 82 are connected by a hydraulic hose (not shown) long enough to flex as axle 130 extends, and the hose flexes as axle 130 is retracted.

The extendible steering link means may be utilized with other axle extension mechanisms, but the preferred embodiment is described above. Other design modifications may be made without departing from the invention. For example, other cross-sectional designs for the extendible axle may be utilized, and variations may be made in mounting of the hydraulic cylinders. The scope of the invention is determined by the following claims.

What is claimed is:

1. A self-propelled boom vehicle carrying at its tip end either a work platform or a work attachment, comprising:

a chassis, a boom carried by said chassis, first and second steerable wheels connected to first and second pivotable mounting hubs, an extendible axle means extending between said pair of steerable wheels, including a hollow central support sleeve connected to said chassis, and first and second hollow telescopic arm sections, each of said arm sections being connected to said central support sleeve and movable between a retracted position and an extended position, hydraulic axle extension means positioned inside said hollow central support sleeve and connected to said first and second hollow telescopic arm sections to cause said arm sections to move between said retracted and extended positions as the vehicle is driven forwardly or rearwardly while supporting the weight of said vehicle, and without requiring the operator of said vehicle to leave the controls of the vehicles, first and second hydraulic steering cylinders carried inside said first and second telescopic arm sections, respectively, and first and second steering arms carried by first and second steering wheel mounting hubs, said steering arms cooperating with said hydraulic steering cylinders to steer said vehicle without requiring the use of a steering tie rod extending between said steerable wheels.

2. The apparatus of claim 1 wherein said first and second steering cylinders are in a closed hydraulic circuit working in a master-slave arrangement and operate inversely with respect to each other, so that as one steering cylinder extends, the other retracts.

3. The apparatus of claim 2 wherein each of said steering cylinders includes a piston and further comprising steering resynchronizing means including a mechanical check valve carried by each said piston which allows excess hydraulic fluid to flow through said check valve when said steering is moved to the full lock position in either direction and which allows said piston to travel to the end of its stroke, thereby resynchronizing said extendible steering link means.

4. The apparatus of claim 3 wherein each of said steering resynchronizing means is carried inside one of said steering cylinders.

5. The apparatus of claim 1 wherein said vehicle, with said extendible axle means retracted, has an overall width of eight feet and has an eighty foot long boom when extended and is transportable of public highways without any special permits.

6. A self-propelled boom vehicle carrying at its tip end either a work platform or a work attachment, comprising:

a chassis, a boom carried by said chassis, a pair of steerable wheels each connected to a pivotable mounting hub, an extendible axle means extending between said pair of steerable wheels, including a hollow central support sleeve connected to said chassis, and first and second hollow telescopic arm sections, each of said arm sections being connected to said central support sleeve and movable between a retracted position and an extended position, hydraulic axle extension means positioned inside said hollow central support sleeve and connected to said first and second hollow telescopic arm sections to cause said arm sections to move between said retracted and extended positions as the vehicle is driven forwardly or rearwardly while supporting the weight of said vehicle, and without requiring the operator of said vehicle to leave the controls of the vehicle, first and second hydraulic steering cylinders which operate in a closed hydraulic circuit in a master-slave arrangement and operate inversely with respect to each other, so that as one steering cylinder extends, the other retracts, wherein each of said steering cylinders includes a piston, and further comprising steering resynchronizing means including a mechanical check valve which allows excess hydraulic fluid to flow through said check valve when said steering is moved to the full lock position in either direction, and which allows said piston to travel to the end of its stroke, thereby resynchronizing said steering cylinders, and first and second steering arms carried by first and second pivotable steering wheel mounting hubs, said steering arms cooperating with said hydraulic steering cylinders to steer said vehicle without requiring the use of a steering tie rod extending between the steerable wheels.

7. A self-propelled boom vehicle carrying at its tip end either a work platform or a work attachment, comprising:

a chassis, a boom carried by said chassis, first and second steerable wheels connected to first and second pivotable mounting hubs, an extendible axle means extending between said pair of steerable wheels, including a hollow central support sleeve connected to said chassis, first and second telescopic arm sections, each of said arm sections being connected to said central support sleeve and movable between a retracted position and an extended position, said vehicle with said extendible axle means in its retracted position being transportable on a trailer over public highways without any special permits, and said vehicle with said extendible axle in its extended position having an increased resistance to overturn, hydraulic axle extension means positioned inside said hollow central support sleeve and connected to said first and second telescopic arm sections to cause said arm sections to move between said retracted and extended positions as the vehicle is driven forwardly or rearwardly while supporting the weight of said vehicle, and without requiring the operator of said vehicle to leave the controls of the vehicle, and steering means for steering said first and second steerable wheels without requiring the presence of a tie rod extending between said steerable wheels.

\* \* \* \* \*